May 1, 1923.                                                                              1,453,936
J. J. GUNN
ADJUSTABLE BEARING BOX
Filed Oct. 7, 1922                                        2 Sheets-Sheet 1
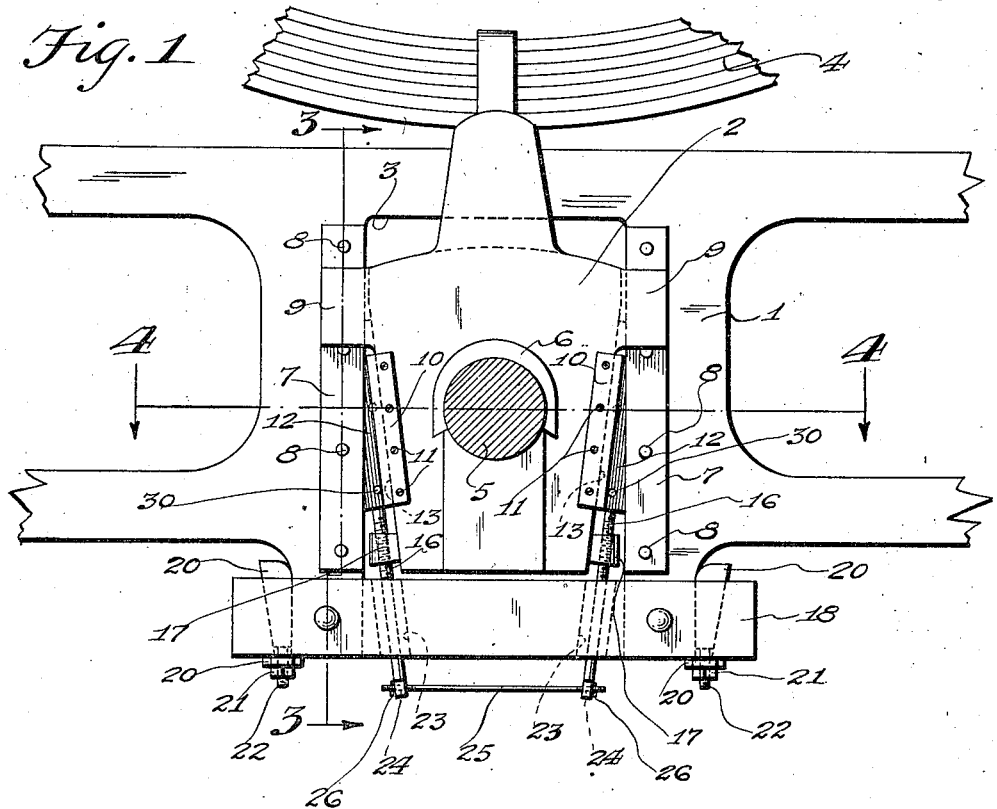
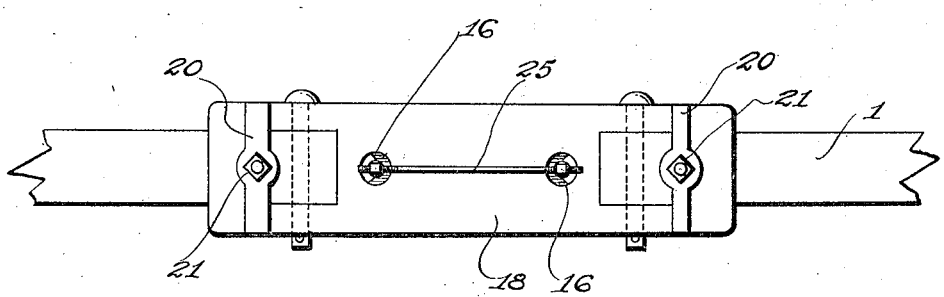
JOHN J. GUNN
INVENTOR
BY Victor J. Evans
ATTORNEY May 1, 1923.
J. J. GUNN
1,453,936
ADJUSTABLE BEARING BOX
Filed Oct. 7, 1922
2 Sheets-Sheet 2
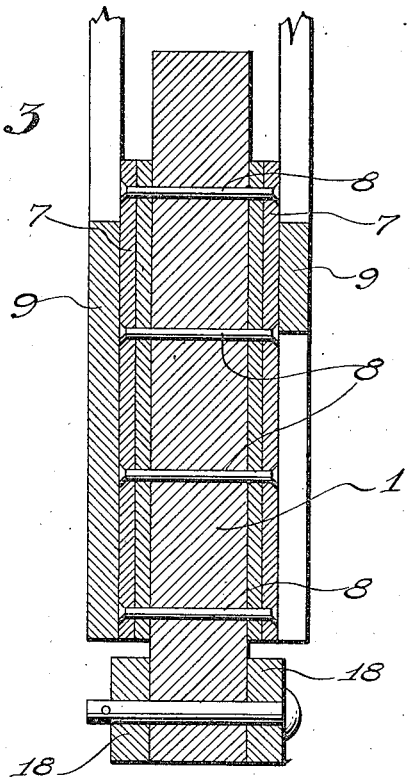
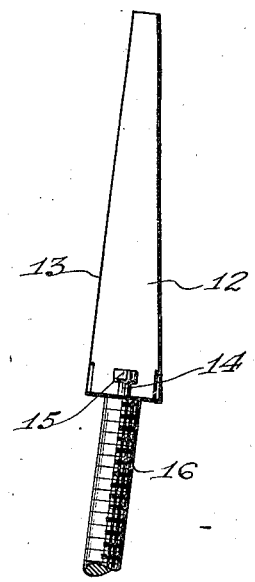
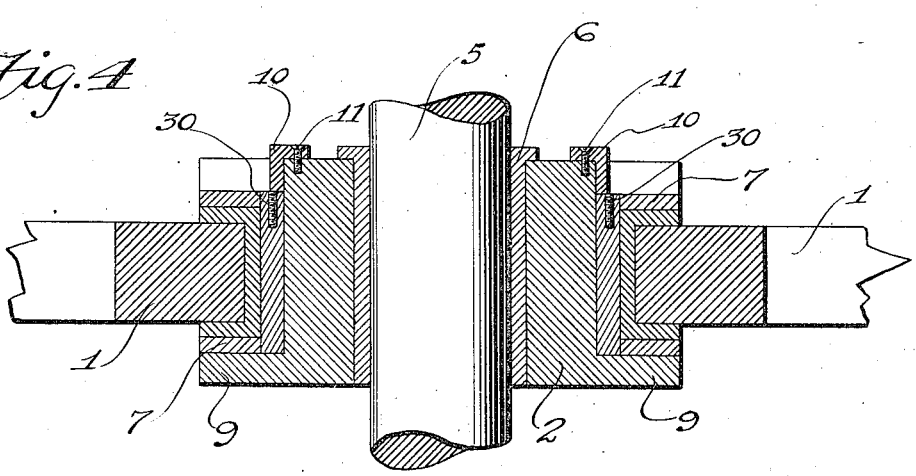
JOHN J. GUNN
INVENTOR
BY *Victor J. Evans*
ATTORNEY Patented May 1, 1923.

1,453,936

UNITED STATES PATENT OFFICE.

JOHN J. GUNN, OF CHICAGO, ILLINOIS.

ADJUSTABLE BEARING BOX.

Application filed October 7, 1922. Serial No. 593,076.

*To all whom it may concern:*

Be it known that I, JOHN J. GUNN, a citizen of the United States, residing at Chicago, in the county of Cook and State of Illinois, have invented new and useful Improvements in Adjustable Bearing Boxes, of which the following is a specification.

This invention relates to bearing or journal boxes particularly designed for use on locomotives, and an object of the invention is to provide an adjustable bearing or journal box particularly designed for use on the driver carrying axles of the locomotive which will eliminate much of the expense and work contingent with the wheeling of a locomotive.

Another object of this invention is to provide an adjustable bearing box structure as specified which will eliminate the necessity of planing, chipping, and many drilling, tapping and welding operations in the construction of the bearing boxes, also a construction which will eliminate the necessity of putting up or placing the binders, to facilitate the laying off of the engines, and to provide a bearing box structure which can be assembled and put in place prior to the placing of the wheels upon the engine, the said bearing box being adjustable to permit proper adjustment after the mounting of the wheels.

Another object of the invention is to provide a bearing box structure which may be standardized thereby permitting the bearing wedges to be made in quantities and placed in stock and one which comprises adjustable wedges which may be easily adjusted from the outside of the engine for eliminating wear and lost motion during the operation of the engine.

A further object of the invention is to provide an adjustable bearing box structure as specified in which suitable adjusting wedges are adjustably supported, and arranged, so as to prevent binding during the travel of the locomotive, as the tendency of the weight of the locomotive will be to slide past the wedges, the said wedges cooperating for permitting proper adjustment of the driving axles.

Other objects of the invention will appear in the following detailed description taken in connection with the accompanying drawings wherein:

Fig. 1 is a side elevation of the improved adjustable bearing or journal box, looking from the inside of the box.

Fig. 2 is a bottom plan of the box structure.

Fig. 3 is a vertical section taken on the line 3—3 of Fig. 1.

Fig. 4 is a cross section taken on the line 4—4 of Fig. 1.

Fig. 5 is a detail edge elevation of one of the adjusting wedges.

Referring more particularly to the drawings, the improved adjustable bearing box is illustrated in Fig. 1 as associated with its carrying frame 1, and the driving box proper 2, is supported in a suitable opening 3 in the frame 1 and is connected in the usual manner to the locomotive springs 4. The driving axle 5 is mounted in the box 2, in the usual approved manner, rotating in the liner 6 which may be of Babbitt metal, brass or the like such as commonly used in bearing boxes of this nature.

The frame 1 has wear plates 7 of brass or analogous material attached thereto by means of suitable rivets 8, and the wings or cross heads 9 of the box structure 2 slidably engage these wear plates as clearly shown in the drawings.

The outer edges of the bearing box 2 taper inwardly as they extend downwardly, as clearly shown in Fig. 1 of the drawings and the keeper plates 10 are attached by cap screws or analogous attaching devices 11 to the bearing box 2 and project beyond the tapered edges thereof engaging the adjusting wedges 12. The adjusting wedges 12 have their inner sides 13 tapered to snugly fit against the tapered edges of the bearing box while their outer sides are shaped for snugly fitting against the facing surfaces of the frame 1. The wedges 12 are provided with transversely extending T slots 14 opening out at one side in which the substantially T heads 15 of the adjusting bolts 16 are seated. The adjusting bolts 16 extend threadably through lugs 17 which are formed upon the bearing box 2 and they also project through the binder 18 which is attached to the frame 1 in the usual manner, by the clamping wedges 20 and nuts 21 which are threaded on the threaded stems 22 on the binding wedges 20. The binder 18 is provided with suitable openings 23 through which the adjusting bolts 16 extend. The lower ends of the adjusting bolts 16 are provided with transverse eyes 24 through which a rod 25 extends. Cotter pins 26 are provided for preventing accidental movement of the rod 25 which rod locks the adjusting bolts 16 against rotary movement and against adjustment of the wedges 12. However, it permits movement of the frame relative to the wedges under weight and road-bed conditions during the travel of a locomotive equipped with the device.

The wedges 12 are provided with drilled holes 30 which are adapted to facilitate the placing or removal of the wedge blocks from their proper position.

The usual approved type of oil boxes are cast in the bearing box 2, in the usual manner and the wedges are also to be provided with the lubricant feeding grooves and any other means necessary for proper lubrication, without departing from the spirit of this invention.

The threaded portions of the adjusting bolts 16 are larger in diameter than the heads 15 thereof, so that the bolts may be removed, through the threaded openings in the lugs 17 to permit disconnection of the bolts without taking down the entire structure.

From the foregoing description taken in connection with the accompanying drawings it will be apparent that the frame protecting shoes under the wear plates 7 could be case hardened, if desired thereby eliminating wear thereon and transferring the wear to the wedges 12 which may be readily replaced at a minimum expense and it will also be apparent that the laying off of an engine would be considerably simplified and with the use of the improved bearing box would consist substantially of only striking or marking a square on any one of the jaws from the cylinder (not shown) of the engine and then striking a point on the frame convenient to the outside thereof and then placing or setting the main wheels to these points and the other wheels according to the connecting or driving rod lengths.

It will also be apparent that the use of the improved bearing box will eliminate the necessity of taking down or removing the binders 18 in case they do not properly align after the laying off of the engine.

It is, of course, to be understood that the invention may be constructed in other manners and the parts associated in different relations and therefore, I do not desire to be limited in any manner except as set forth in the claims hereunto appended.

Having thus described my invention what I claim is:

1. In a device as set forth, the combination with a frame, of a bearing box having its edges tapering inwardly as they extend downwardly, adjusting wedges, adjusting bolts carried by said bearing box and connected to said wedges, said wedges engaging the facing surfaces of the bearing box and frame.

2. In a device as set forth, the combination with a frame, of a bearing box having its edges tapering inwardly as they extend downwardly, adjusting wedges, adjusting bolts carried by said bearing box and connected to said wedges, said wedges engaging the facing surfaces of the bearing box and frame, and a locking rod detachably connected to said adjusting bolts for preventing accidental rotation of the adjusting bolts.

3. In a device as set forth, the combination with a frame, of a bearing box having its edges tapering inwardly as they extend downwardly, adjusting wedges, said wedges provided with T shaped openings, adjusting bolts having substantially T shaped heads detachably engaging in said openings, said adjusting bolts being adjustably carried by said bearing box to permit adjustment of the the wedges relative to the bearing box and frame.

4. In a device as set forth, the combination with a frame, of a bearing box having its edges tapering inwardly as they extend downwardly, adjusting wedges, said wedges provided with T shaped openings, adjusting bolts having substantially T shaped heads detachably engaging in said openings, said adjusting bolts being adjustably carried by said bearing box to permit adjustment of the wedges relative to the bearing box and frame, and keeper plates carried by the bearing box and engaging said wedges.

5. In a device as set forth, the combination with a frame, of a bearing box having its edges tapering inwardly as they extend downwardly, adjusting wedges, said wedges provided with T shaped openings, adjusting bolts having substantially T shaped heads detachably engaging in said openings, said adjusting bolts being adjustably carried by said bearing box to permit adjustment of the wedges relative to the bearing box and frame, and keeper plates carried by the bearing box and engaging said wedges, and a locking rod connected to said adjustment bolts for preventing accidental movement thereof.

In testimony whereof I affix my signature.

JOHN J. GUNN.